United States Patent [19]
Allen et al.

[11] Patent Number: 5,965,027
[45] Date of Patent: *Oct. 12, 1999

[54] PROCESS FOR REMOVING SILICA FROM WASTEWATER

[75] Inventors: Stephen D. Allen, Holladay; Leonard R. Lyman, South Jordan, both of Utah

[73] Assignee: Microbar Incorporated, Sunnyvale, Calif.

[*] Notice: This patent is subject to a terminal disclaimer.

[21] Appl. No.: 08/965,574

[22] Filed: Nov. 6, 1997

Related U.S. Application Data

[63] Continuation-in-part of application No. 08/756,681, Nov. 26, 1996.

[51] Int. Cl.[6] .................................. C02F 1/44; C02F 1/56
[52] U.S. Cl. .................... 210/638; 210/639; 210/651; 210/652; 210/728; 210/734; 210/735
[58] Field of Search ..................... 210/638, 639, 210/650, 651, 652, 728, 734, 735

[56] References Cited

U.S. PATENT DOCUMENTS

| | | | |
|---|---|---|---|
| 1,324,118 | 12/1919 | Hottinger et al. | 210/702 |
| 3,075,645 | 1/1963 | Riddick | 210/197 |
| 3,097,163 | 7/1963 | Riddick | 210/53 |
| 3,101,317 | 8/1963 | Starry | 210/52 |
| 3,521,752 | 7/1970 | Lindman | 210/56 |

(List continued on next page.)

OTHER PUBLICATIONS

S. A. Wasay, B. K. Puri and I. Haq, "Removal of Trace Heavy Metals by Metal Chelates", *Intern. J. Environmental Studies*, vol. 36, pp. 191–197 (1990).

G.B. Harris and S. Monette, "The Stability of Arsenic–Bearing Residues", presented at *TMS–AIME Symposium*, pp. 1–20 (Jan. 25–29, 1988).

T. Tetsumi, M. Sumi, M. Tanaka and T. Shono, "Direct Reaction of Metal Powders with Several Sodium Dithiocarbamates", *Polyhedron* vol. 5, pp. 707–710 (Sep. 2, 1985).

T. Tetsumi, M. Sumi, M. Tanaka and T. Shono, "Reaction of Copper Powder with Tetraalkylthiuram Disulphides", *Polyhedron*, vol. 4, pp. 1439–1442 (Feb. 6, 1985).

Stanislav Miertus and Vladimir Frecer, Theoretical Study of the Electron Structure and Properties of Dithiocarbamates and their Complexes with Transmition Metals, *Collection Czechoslavak Chem. Commun.*, vol. 49, pp. 2744–2750 (1984).

R. R. Scharfe, V.S. Sastri and C. L. Chakrabarti, "Stability of Metal Dithiocarbamate Complexes", *Analytical Chemistry*, vol. 45, pp. 413–415 (Feb. 1973).

(List continued on next page.)

*Primary Examiner*—Ernest G. Therkorn
*Attorney, Agent, or Firm*—Madson & Metcalf

[57] ABSTRACT

A process and system for removing silica from large volumes of wastewater is disclosed. In the process, a wastewater stream containing silica is treated with a chemical coagulant, such as a epichlorohydrin/dimethylamine polymer, to create spherical particles which agglomerate into clusters having a diameter greater than 5 microns. Treated wastewater is passed through a microfiltration membrane which physically separates the silica contaminant particle from the wastewater. Commercially available microfiltration membranes having a pore size from 0.5 micron to 5 microns may be used. The treated wastewater flow rate through the microfiltration membranes can range from 150 gallons per square foot of membrane per day ("GFD") to 600 GFD. Solids are removed from the membrane surface by periodically backflushing the microfiltration membranes and draining solids at timed intervals from the filtration vessel within which the membranes are located. The dislodged solid material within the filtration vessel is flushed into a holding tank for further processing of the solids.

24 Claims, 6 Drawing Sheets

U.S. PATENT DOCUMENTS

| | | | |
|---|---|---|---|
| 3,544,476 | 12/1970 | Aiba et al. | 252/175 |
| 4,016,075 | 4/1977 | Wilkins | 210/42 R |
| 4,188,291 | 2/1980 | Anderson | 210/652 |
| 4,207,183 | 6/1980 | Herrigel | 210/651 |
| 4,246,102 | 1/1981 | Hjelmner et al. | 210/704 |
| 4,260,493 | 4/1981 | Kretas et al. | 210/714 |
| 4,276,180 | 6/1981 | Matson | 210/683 |
| 4,420,401 | 12/1983 | Kretas et al. | 210/714 |
| 4,450,057 | 5/1984 | Kelly | 204/98 |
| 4,504,356 | 3/1985 | Mülder et al. | 162/29 |
| 4,731,187 | 3/1988 | Moriya et al. | 210/719 |
| 4,765,913 | 8/1988 | Featherstone | 210/714 |
| 4,780,211 | 10/1988 | Lion | 210/644 |
| 4,938,876 | 7/1990 | Ohsol | 210/708 |
| 4,957,634 | 9/1990 | Bowers, Jr. | 210/711 |
| 5,078,900 | 1/1992 | Wegner | 210/638 |
| 5,108,620 | 4/1992 | Wester et al. | 210/725 |
| 5,164,095 | 11/1992 | Sparapany et al. | 210/735 |
| 5,171,453 | 12/1992 | Communal | 210/725 |
| 5,182,023 | 1/1993 | O'Conner | 210/652 |
| 5,205,939 | 4/1993 | Syrinek | 210/727 |
| 5,246,686 | 9/1993 | Cuer et al. | 423/467 |
| 5,453,206 | 9/1995 | Browne | 210/711 |
| 5,510,040 | 4/1996 | Miller | 210/912 |
| 5,512,181 | 4/1996 | Matchett | 210/649 |
| 5,556,545 | 9/1996 | Volchek | 210/651 |
| 5,575,915 | 11/1996 | Nakamura | 210/651 |
| 5,605,633 | 2/1997 | Nakamura | 210/732 |
| 5,609,765 | 3/1997 | Bowman | 210/651 |
| 5,620,629 | 4/1997 | Salmen et al. | 252/180 |

OTHER PUBLICATIONS

Serge J. Joris, Keijo I. Aspila, and Chuni L. Chakrabarti, "On the Monobasic or Dibasic Character of Dithiocarbamic Acids", Analytical *Chemistry*, vol. 41, pp. 1441–1445 (Sep. 1969).

Keijo I. Aspila, Vedula S. Sastri and Chuni L. Chakrabarti, "Studies on the Stability of Dithiocarbamic Acids", *Talanta Review*, vol. 16, pp. 1099–1102 (Feb. 19, 1969).

Adam, Hulanicki, "Complexation Reactions of Dithiocarbamates", Talanta Review, vol. 14, pp. 1371–1372 (May 24, 1967).

M. J. Janssen, "The Stability Constants of Metal Complexes of Some N–Dialkyldithiocarbamic Acids—Part II. Copper Complexes in Ethanol/Water Mixtures of Various Compositions", *Recueil*, vol. 76, pp. 827–835 (1957).

M. J. Janssen, "The Stability Constants of Metal Complexes of Some N–Dialkyldithiocarbamic Acids—Part I. Copper Complexes in 75% ($^v/_v$) Ethanol Water", *Recueil*, vol. 75, pp. 1411–1422 (1956).

PROCESS FOR REMOVING SILICA FROM WASTEWATER

RELATED PATENT APPLICATION

This invention is a continuation-in-part of U.S. patent application Ser. No. 08/756,681 entitled "Wastewater Treatment Process and Apparatus for High Flow Impurity Removal" filed Nov. 26, 1996, which application is incorporated herein by reference.

FIELD OF THE INVENTION

The present invention relates to the high flow treatment and purification of wastewater containing silica. More particularly, the present invention relates to process and apparatus for removing silica from large quantities of wastewater using a combination of filter membranes and organic polymers.

BACKGROUND OF INVENTION

Many industrial operations generate large quantities of water containing silica. For instance, chemical mechanical polishing (CMP) processes, widely used in the manufacture of semiconductor devices, produce waste water streams containing high quantities of silica. CMP processes are used to polish the silicon-based wafer surface during various stages of semiconductor manufacture. Waste streams containing the polishing slurry and silica are produced during CMP. The silica must be removed before the water can be safely discharged to the environment or recycled within the facility.

Dissolved silica in industrial cooling water is a major problem. Silica is a scale forming material commonly found in cooling water which can foul heat exchangers, pipes, valves, pumps, and boilers. No known inhibitor, chelating agent or dispersant exists which will significantly control silica's tendency to form scale. When the silica concentration in a cooling water system exceeds its solubility limit of roughly about 150 to about 200 milligrams per liter, silica polymerizes to form scale. It may also react with multivalent cations, such as magnesium and calcium, to form scale.

Researchers have examined many different methods of removing soluble silica, including the use of ferric sulfate, calcium chloride, magnesium chloride, magnesium sulfate, magnesium oxide, aluminum hydroxide, sodium aluminate and activated alumina. Activated alumina has received much attention in processes for removing silica. See, U.S. Pat. No. 4,276,180 to Matson and U.S. Pat. No. 5,512,181 to Matchett. Other aluminum containing compounds such as sodium aluminate, aluminum sulfate, and aluminum chloride in an alkaline environment (pH greater than 8) have been used to remove soluble and colloidal silica. See, U.S. Pat. No. 5,453,206 to Browne. However, these processes are not capable of processing large volumes of wastewater through high flow mechanical systems because of degradation of particles and particulates below 5 micron in size.

Microfiltration systems have been considered to remove silica contaminants from wastewater. However, traditional microfiltration membranes having a pore size of about 0.5 microns rapidly clog with silica that was precipitated with conventional inorganic coagulants. Such particulates are consistently less than 1.0 micron in size. Moreover, the inorganic coagulants cannot aid in the precipitation of microfine colloidal silica. The partially formed floc will also deform and block the membrane pores, preventing flow.

There is, therefore, a need in the art for improved processes for removing silica from wastewater.

Such processes and systems are disclosed and claimed herein.

SUMMARY OF THE INVENTION

The present invention is directed to a process for removing silica from large volumes of wastewater. In the process, a wastewater stream containing silica is treated with an organic polymer. The coagulant reacts with the silica to form spherical particulates which agglomerate into clusters having a size greater than about $5\mu$. As used herein, a wastewater stream includes raw water containing silica as well as process water streams containing silica.

Organic and polymeric coagulants which can be used to achieve the desired particulate formation, such as polyacrylamides (cationic, nonionic, and anionic), epi-dma's (epichlorohydrin/dimethylamine polymers), DADMAC's (polydiallydimethylammonium chlorides), copolymers of acrylamide and DADMAC, natural guar, etc. The stoichiometric ratio of coagulant to silica is preferably optimized to result in acceptable silica removal at minimum coagulant cost. The required coagulant concentration will depend on several factors, including silica contaminant influent concentration, wastewater flow rate, silica contaminant effluent compliance requirement, coagulant/contaminant reaction kinetics, etc. For silica contaminants, the ratio of silicon to coagulant contaminant is typically in the range from 20:1 to 50:1, depending on the system, an preferably about 40:1. If small amounts of silica can remain in the effluent stream, then the ratio of silicon to coagulant can be 120:1 or even higher. The optimum mole ratio will also vary depending on the coagulant used. For instance, low molecular weight epi-dma and very high molecular weight epi-dma require from 3 to 5 times the dose to flocculate the silicon.

It has been found that the foregoing organic coagulants cause the silica to form well defined spherical particles having a typical particle size in the range from about $10\mu$ to $90\mu$. The silica particles are easily separated from microfiltration membranes enabling efficient silica removal without membrane degradation.

Small amounts of a supplemental coagulant can optionally be used in combination with the organic and polymeric coagulant to optimize the silica removal. Examples of typical supplemental coagulants include, aluminum chlorohydrate ("ACH," $Al_nOH_{2n-m}Cl_m$, e.g., $Al_4OH_6Cl_2$ with a typical Al:Cl ratio of 2:1), sodium aluminate ($NaAlO_2$), aluminum chloride ($AlCl_3$), and polyaluminum chloride ("PAC," $Al_6OCl_5$). The typical mole ratio of silica to inorganic coagulant is about 25:1.

Treated wastewater is passed through a microfiltration membrane which physically separates the silica contaminant from the wastewater. Suitable microfiltration membranes are commercially available from manufacturers such as W. L. Gore, Koch, and National Filter Media (Salt Lake City, Utah). For instance, one GOR-TEX® membrane used in the present invention is made of polypropylene felt with a sprayed coating of teflon. The teflon coating is intended to promote water passage through the membrane. Such microfiltration membrane material has been found to be useful for many wastewater treatment systems. However, when used in a system for removing fluoride or silica, it has been observed that the coagulated particles adhere to the exterior and interior surface and plug the membrane. Backflushing was not effective in such cases.

The microfiltration membranes are used in a tubular "sock" configuration to maximize surface area. The membrane sock is placed over a slotted tube to prevent the sock from collapsing during use. A net material is placed between the membrane sock and the slotted tube to facilitate flow between the membrane and the slots in the tube. In order to achieve the extremely high volume flow rates, a large number of membrane modules, each containing a number of individual filter socks, are used.

The microfiltration membranes preferably have a pore size in the range from 0.5 micron to 5 micron, and preferably from 0.5 micron to 1.0 micron. By controlling the ratio of coagulant to silica contaminant, 99.99% of the precipitated contaminant particles can be greater than 5 microns. This allows the use of larger pore size microfiltration membranes. It has been found that the treated wastewater flow rate through 0.5 to 1 micron microfiltration membranes can be in the range from 150 gallons per square foot of membrane per day ("GFD") to 600 GFD.

Solids are preferably removed from the membrane surface by periodically backflushing the microfiltration membranes and draining the filtration vessel within which the membranes are located. The periodic, short duration back flush removes any buildup of contaminants from the walls of the microfiltration membrane socks. The dislodged solid material within the filtration vessel is flushed into a holding tank for further processing of the solids.

The wastewater treatment system disclosed herein is designed to provide compliance with the contaminant silica discharge effluent limits. Wastewater pretreatment chemistry creates insoluble silica contaminant particulates which are efficiently removed by the microfiltration membranes.

DETAILED DESCRIPTION OF THE INVENTION

The present invention is directed to a process for removing silica contaminants from large volumes of wastewater. In operation, the wastewater is collected and pretreated with one or more organic polymer coagulants such that the silica reacts with the coagulant(s) to form spherical particulates which agglomerate into clusters having a size greater than about $5\mu$. The chemical coagulants are preferably mixed with the wastewater using reaction vessels or static in-line mixers, although other mixing methods can be used.

The treated wastewater is then passed through a microfiltration membrane having a pore size in the range from $0.5\mu$ to $5\mu$ to remove the silica contaminant particulates. In such a system, wastewater flow rates in the range from 150 gallons per square foot of membrane per day ("GFD") to 600 GFD are possible. The microfiltration membrane is periodically backflushed to remove solids from the membrane surface. The rejected solids are gravity collected in the filter vessel bottom and time cycle discharged to a settling tank for further sludge processing.

The microfiltration membranes are preferably provided in a cassette arranged module. The microfiltration membranes provide a positive particle separation in a high recovery dead head filtration array. The dead head filtration operates effectively at low pressures (4 psi to 15 psi, preferably 5 psi to 10 psi) and high flow rates, allowing 100% discharge of the supplied water with no transfer pumps needed. Solids which settle on the wall of the membrane during filtration are periodically backflushed away (and gravity settled) from the membrane surface to ensure a continuously clean filtration area. The individual cassette module design allows for easy replacement of the membrane modules.

Currently preferred filter socks useful with the present invention contain a teflon coating on a polypropylene or polyethylene felt backing material. Such socks are available from W. L. Gore. Another presently preferred filter sock manufactured by National Filter Media, Salt Lake City, Utah, consists of a polypropylene membrane bonded to a polypropylene or polyethylene felt backing. Membrane "failure" is due primarily to flux loss, not mechanical failure. Many operations deem it more cost-effective to replace the membrane socks instead of cleaning contaminants from the membrane.

The membrane life is important to the continuous operation and operational cost of the filtration system. The membranes manufactured by W. L. Gore and National Filter Media have been found to be robust and free of catastrophic failures at a temperature of 160° F. and a pH greater than 13. Anticipated operating conditions for the present invention are ambient temperature and pH between 5 and 11. A currently preferred operating pH range is between about 7.3 and 9.3, although good results are obtained ±1.0 pH unit from the optimum pH. It is presently preferred to adjust the pH before adding the organic coagulant. It is expected that membranes used according to the present invention will have a life equal to or greater than 18 months. The filtration system operates at a low pressure, preferably between 4 and 15 psi. Greater pressures are possible; however, the higher the pressure, the quicker the membrane loss of flux. Although the currently preferred operating pressure is below about 25 psi, excellent results have been obtained using the organic coagulants with commercially available high pressure microfiltration systems which operate at pressures between 30 and 80 psi. Existing microfiltration systems using conventional inorganic coagulants can be retrofitted for use with the organic coagulants to obtain dramatically improved performance.

The following examples are offered to further illustrate the present invention. These examples are intended to be purely exemplary and should not be viewed as a limitation on any claimed embodiment.

Example 1

A 15 gpm pilot scale system was used to process wastewater containing fluoride and a combined flow of fluoride and silica. A 38% sodium aluminate solution at a ratio of 0.23:1 Al:F and 50% aluminum chlorohydrate at a dose of 35 ppm to aid in the removal of the fluoride, total dissolved solids (TDS), total suspended solids (TSS), and some of the other present salt forms. The precipitate was flocculated with a medium charge (25±5 mole percent), medium molecular weight anionic polyacrylamide polymer for ease of filtering or settling. This yielded very low to non-detectable effluent values of fluoride and Silt Density Indices (SDI) below 3.0. The filtration membrane was a $0.5\mu$ polypropylene bonded membrane obtained from National Filter Media. The membrane flux was measured at 650 to 800 GFD at a vessel operating pressure less than 9 psi. The results are reported below in parts per million.

| Time Period | Influent F | Effluent F |
|---|---|---|
| A | 130.0 | 1.86 |
| B | 191.5 | 21.7 |
| C | 142.2 | 2.13 |
| D | 120.0 | 0.72 |
| E | 156.5 | 1.41 |
| F | 125.7 | 0.79 |
| G | 60.93 | 0.97 |
| H | 206.25 | 0.95 |
| I | 133.3 | 0.39 |
| J | 112.9 | 0.85 |
| K | 78.2 | 3.96 |
| L | 133.5 | 3.96 |
| Average | 132.6 | 3.8 |
| Min | 60.93 | 0.39 |
| Max | 206.25 | 21.7 |

| Time Period | Influent F + $SiO_2$ | Effluent F + $SiO_2$ |
|---|---|---|
| A | 264.0 | 0.24 |
| B | 172.0 | 0.26 |
| C | 140.0 | 0.31 |
| D | 153.0 | 0.39 |
| E | 98.0 | 0.36 |
| F | 89.0 | 0.29 |
| Average | 152.7 | 0.31 |
| Min | 89.0 | 0.24 |
| Max | 264.0 | 0.39 |

Example 2

A 15 gpm pilot scale system was used to process wastewater containing silica. The silica was present in dissolved and colloidal silica form in the waste stream. A 38% sodium aluminate solution at a ratio of 0.45:1 Al:Si, 46% aluminum sulfate at constant dose of 45 ppm, 50% aluminum chlorohydrate at a dose of 25 ppm, and a 20% epichlorohydrin/ dimethylamine polymer (a high charged, low molecular weight cationic epi-DMA product) at a dosage of 0.25–1.0 ppm to aid in the removal of the silica, TDS and TSS. This formed a well defined particle for filtering or settling. This yielded very low to non-detectable effluent values of the silica and Silt Density Indices (SDI) below 3.0. The filtration membrane was a 0.5 micron polypropylene felt with a PTFE (polytetrafluoroethylene) coating obtained from W. L. Gore. The membrane flux ranged from 175 GFD to 400 GFD at a vessel operating pressure less than 15 psi. The results are reported below in parts per million.

| Time Period | Influent $SiO_2$ | Effluent $SiO_2$ |
|---|---|---|
| A | 140 | 0.443 |
| B | 160 | 0.33 |
| C | 125 | 0.37 |
| D | 153 | 0.39 |
| E | 177 | 0.36 |
| F | 165 | 0.29 |
| Average | 153 | 0.364 |
| Min | 125 | 0.29 |
| Max | 177 | 0.443 |

Example 3

A 3–5 gpm bench scale system was used to process wastewater containing silica. The silica-containing waste stream was obtained from a commercially available CMP slurry sold by Rodel, known as ILD 1300. The ILD 1300 slurry was diluted according to manufacturer's instructions, and it was found to contain about 1380 ppm Si, measured by graphite furnace atomic absorption, and about 70 ppm ammonium ($NH_4$), measured by ion chromatography. One liter of the waste stream weighted about 993.7 grams. The silicon was present in the waste stream as dissolved and colloidal silica. The waste stream was adjusted to a pH of about 8.58 by adding small amounts of sodium hydroxide and sulfuric acid. The waste stream was mixed for about 3 minutes while the pH was adjusted. 2.09 g of a 20% by weight solution of epi-DMA, an epichlorohydrin/ dimethylamine polymer having an average molecular weight of 250,000±50,000 (EnChem Lot I-1396/423/MIC) and 0.19 g of dry aluminum chlorohydrate were added to one liter of the waste stream and mixed for about 20 minutes.

The reaction mixture was pumped at a pressure of about 6 psi through a two foot long filter sock having a diameter of about 3.5 inches. The membrane flux was estimated at 189 GFD. The filter sock contained a GOR-TEX® membrane (Lot. No. 66538-3-786) obtained from W. L. Gore. The membrane had a PTFE (polytetrafluoroethylene) coating on polypropylene felt having a 0.5$\mu$ pore size (1.5$\mu$ absolute).

The filter membrane effluent was collected, and it was found to contain about 15.5 ppm Si, measured by graphite furnace atomic absorption, and about 70 ppm ammonium ($NH_4$), measured by ion chromatography.

The solids were collected from the filter surface and air dried for 24 hours. The recovered solids formed well defined spherical particles which were easily removed from the filter membrane surface. The dried and ground solids were analyzed, and the results are reported below in weight percent.

| ILD 1300 | Results |
|---|---|
| Loss on Drying | 45.53% |
| Carbon | 3.84% |
| Hydrogen | 1.04% |
| Nitrogen | 1.41% |
| Silicon | 36.74% |
| Aluminum | 2.30% |

Other ingredients in the recovered solid, such as sodium, potassium, and unknown proprietary ingredients of ILD 1300, were not analyzed.

Figure 1A:
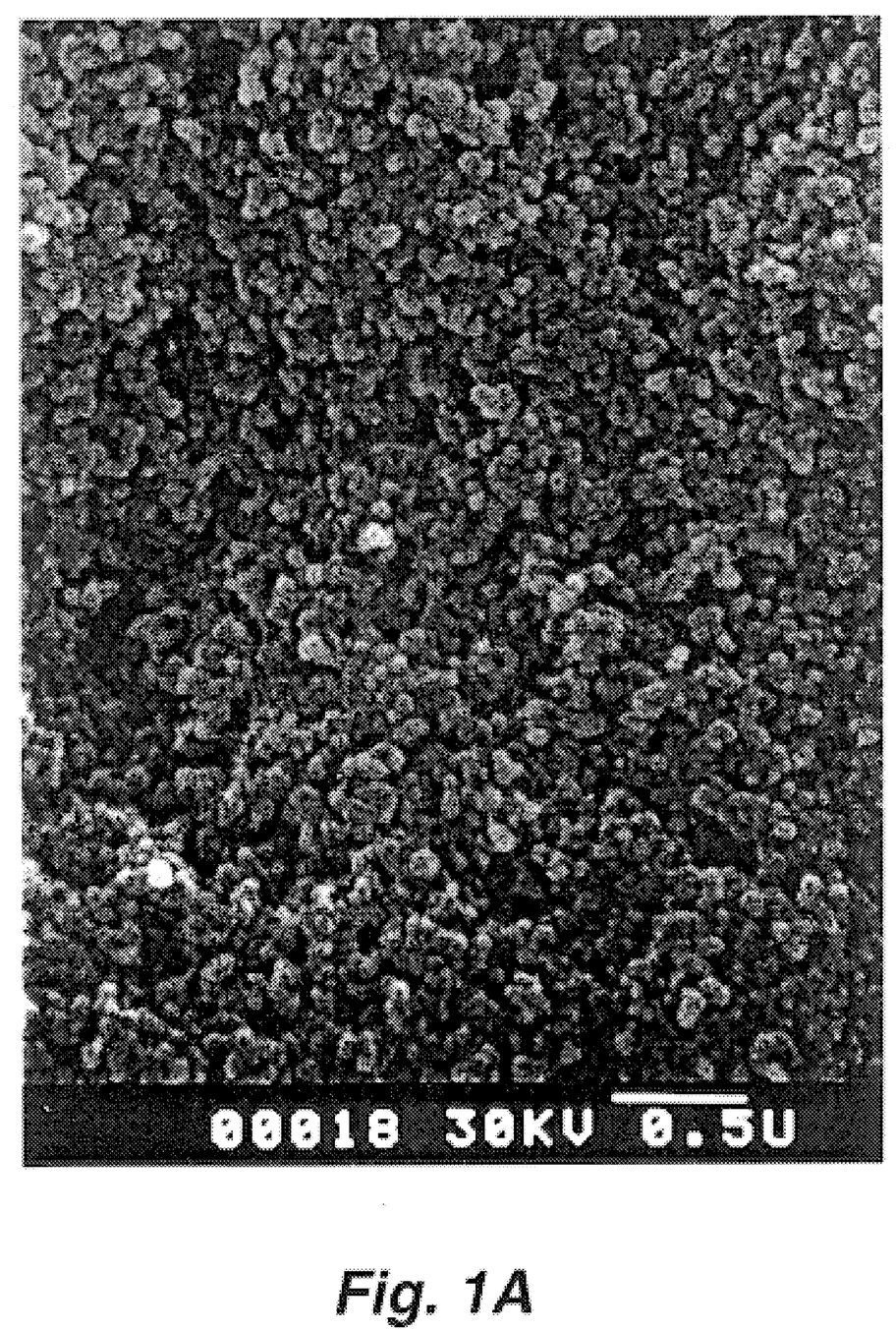
FIG. 1A is a photomicrograph of the precipitated silica particles produced in Example 3 at 24,000x magnification.
Figure 1B:
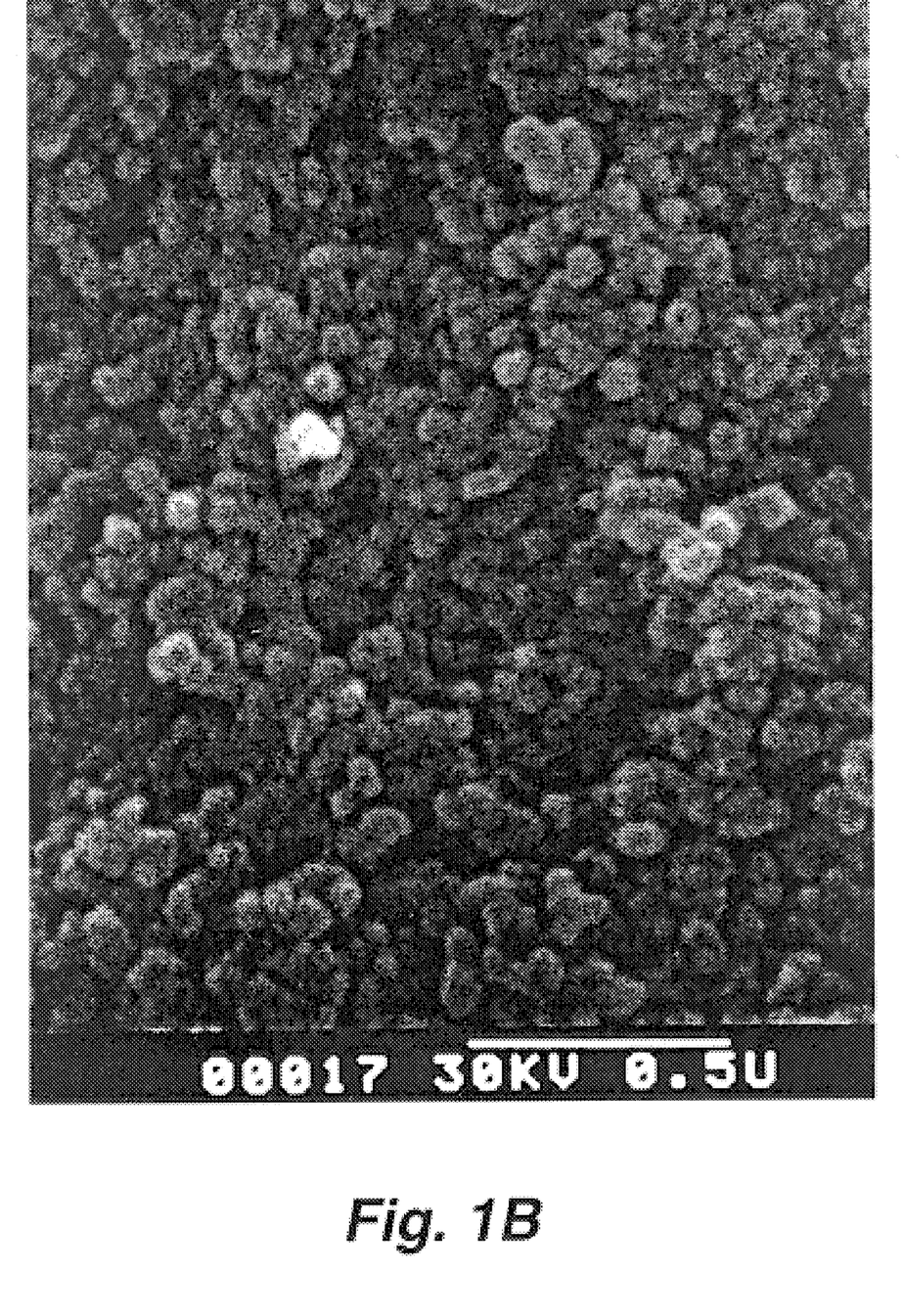
FIG. 1B is a photomicrograph of the precipitated silica particles produced in Example 3 at 49,000x magnification.

FIG. 1A is a scanning electron micrograph (SEM) of the resulting spherical silica particles taken at 24,000x magnification. FIG. 1B is a SEM of the product of FIG. 1A taken at 49,000x magnification. The particles had a typical particle size in the range from 0.05$\mu$ to 0.15$\mu$. Although the spherical particles are smaller than the membrane pore size, it has been found that the particles agglomerate to form large clusters that do not pass through the membrane. The clusters have an average size in the range from 10$\mu$ to 300$\mu$. EDX analysis of the sample indicated the presence of silicon and aluminum in the sample, wherein the concentration of silicon was much greater than the concentration of aluminum.

Example 4

A 3–5 gpm bench scale system was used to process wastewater containing silica. The silica-containing waste stream was obtained from a commercially available CMP slurry sold by Hoescht, known as KLEBOSOL. The KLE- BOSOL slurry was diluted according to manufacturer's instructions, and it was found to contain about 4474 ppm Si and about 3.2 ppm aluminum by graphite furnace atomic absorption. One liter of the waste stream weighed about 998.4 grams. The silicon was present in the waste stream as dissolved and colloidal silica. The waste stream was adjusted to pH 9.84 by addition of small amounts of NaOH and $H_2SO_4$. The waste stream was mixed for about 3 minutes while the pH was adjusted. 2.09 g of a 20% by weight solution of epi-dma, an epichlorohydrin/dimethylamine polymer having an average molecular weight of 250,000±50,000 (EnChem Lot I-1396/423/MIC) was added to one liter of the waste stream and mixed for about 20 minutes.

The reaction mixture was pumped through the filter sock of Example 3 at a pressure of about 6 psi. The filter membrane effluent was collected, and it was found to contain about 8.32 ppm Si and <0.1 ppm aluminum by graphite furnace atomic absorption.

Figure 2A:
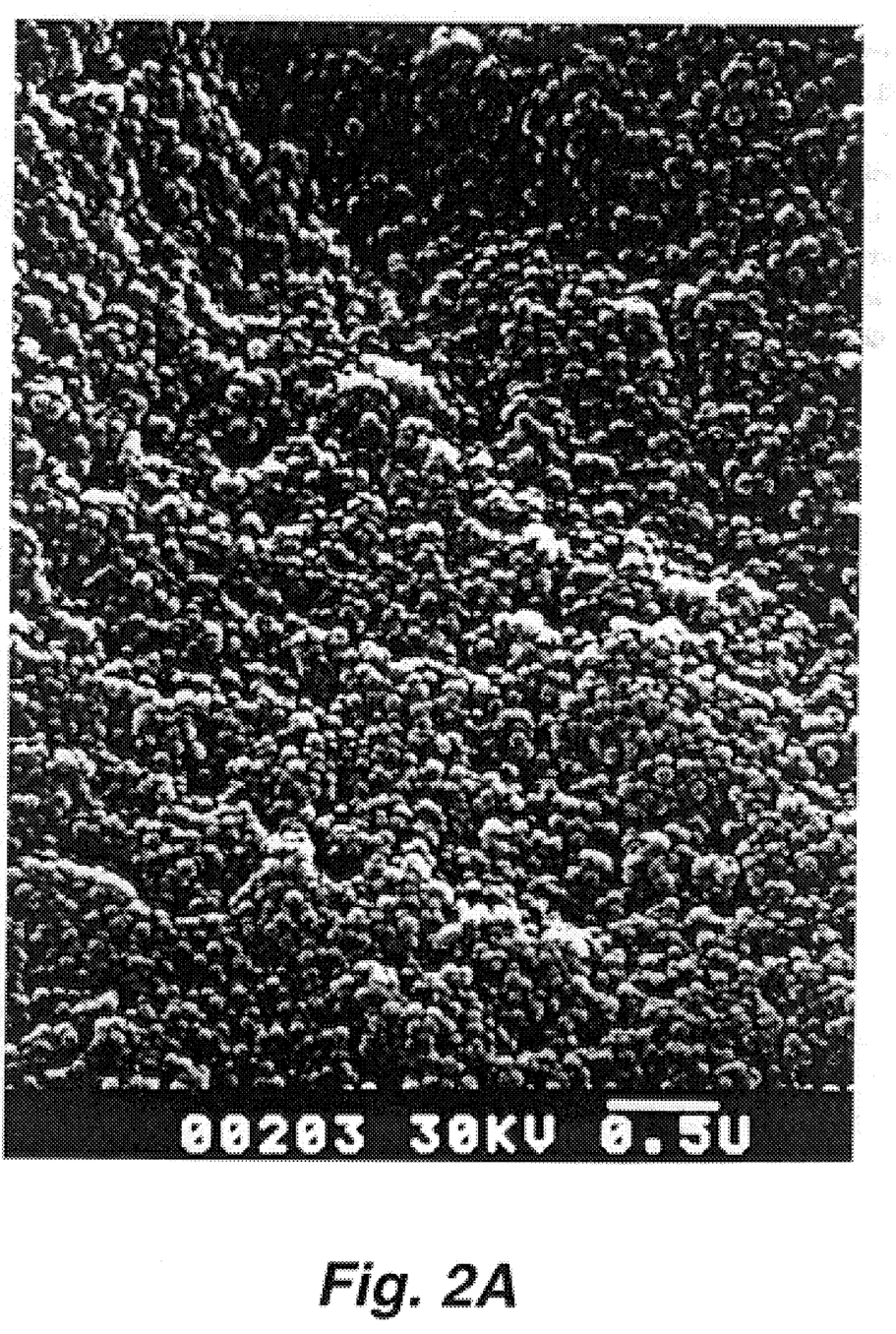
FIG. 2A is a photomicrograph of the precipitated silica particles produced in Example 4 at 20,000x magnification.
Figure 2B:
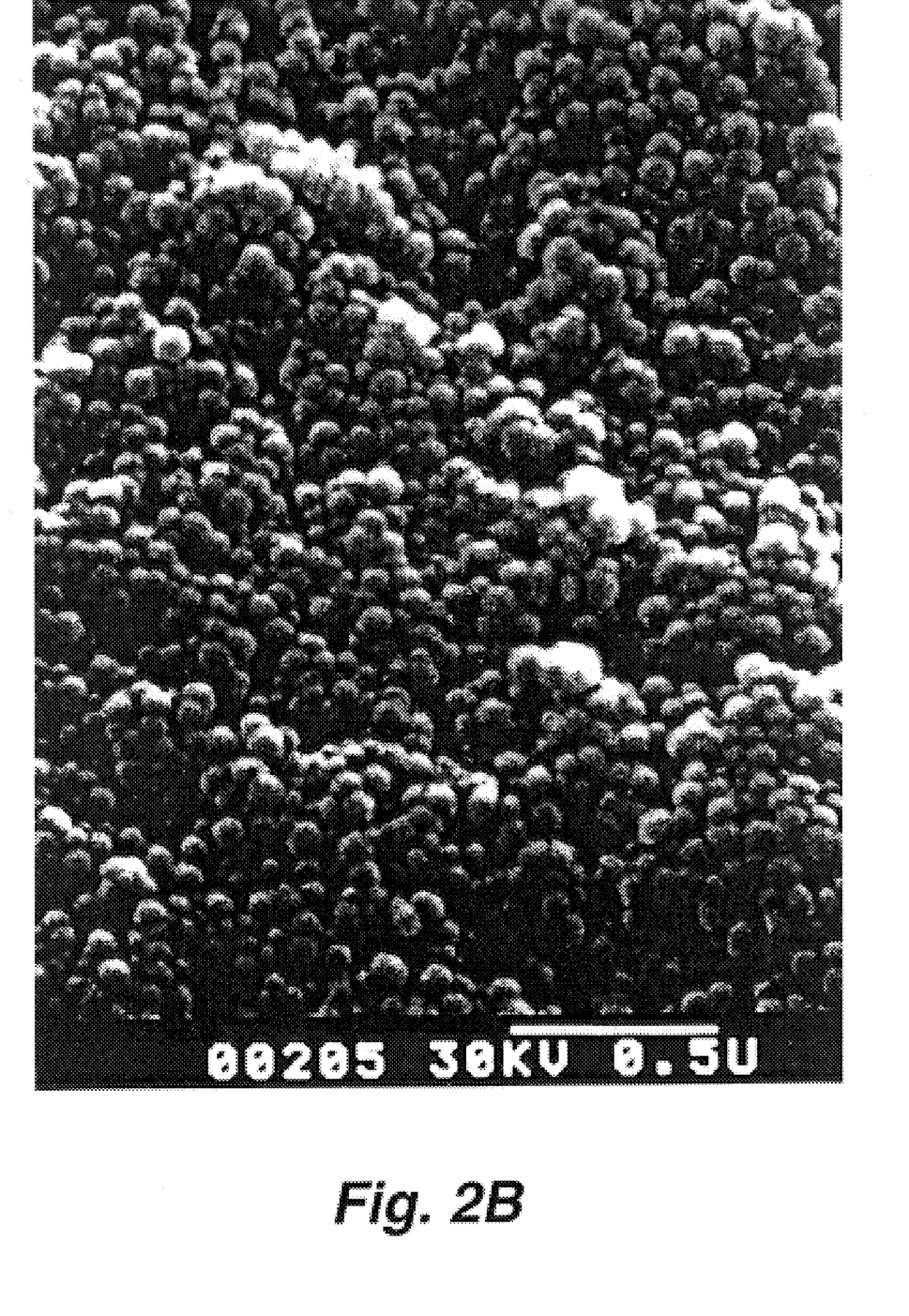
FIG. 2B is a photomicrograph of the precipitated silica particles produced in Example 4 at 40,000x magnification.

The solids were collected from the filter surface and air dried for 24 hours. The solids formed were well defined spherical particles which were easily removed from the filter membrane surface. The solids appeared dry as they were removed from the membrane. FIGS. 2A and 2B are scanning electron micrographs of the resulting spherical silica particles. The particles had a typical particle size in the range from $0.05\mu$ to $0.15\mu$. The dried and ground solids were analyzed, and the results are reported below in weight percent.

| KLEBOSOL | Results |
| --- | --- |
| Loss on Drying | 1.91% |
| Carbon | 1.41% |
| Nitrogen | 0.43% |
| Silicon | 40.49% |
| Aluminum | 0.98% |

FIG. 2A is a scanning electron micrograph (SEM) of the resulting spherical silica particles taken at 20,000x magnification. FIG. 2B is a SEM of the product of FIG. 2A taken at 40,000x magnification. EDX analysis of the sample indicated the presence of silicon and aluminum in the sample, wherein the concentration of silicon was much greater than the concentration of aluminum. The silica particles of FIGS. 2A and 2B are remarkably similar to the silica particles of FIGS. 1A and 1B.

Figure 3:
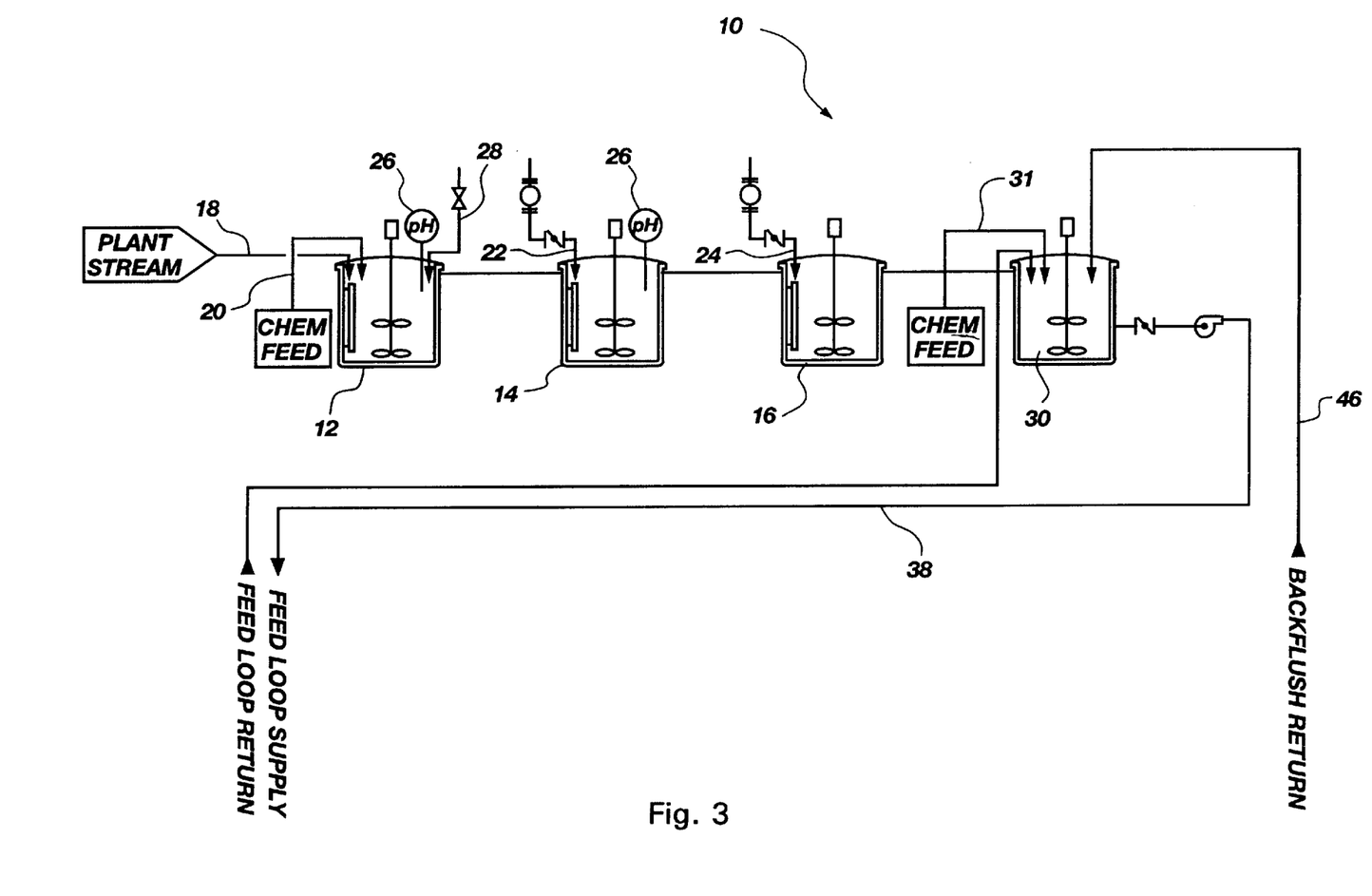
FIG. 3 is a schematic representation of one wastewater pretreatment system.

Reference is made to FIG. 3 which illustrates one possible wastewater pretreatment system 10 within the scope of the present invention. The illustrated wastewater pretreatment system 10 includes a plurality of pretreatment reactor vessels 12, 14, and 16 which enable the wastewater feed stream 18 to chemically react with one or more chemical coagulants. Chemical coagulants which react with contaminants in the wastewater feed stream 18 are introduced into the pretreatment reactor vessels via chemical coagulant feed streams 20, 22, and 24. The pH within the pretreatment reactor vessels is preferably monitored with a pH sensor 26. Acid or base can be added to the pretreatment reactor vessels, if necessary, to adjust the pH via acid/base feed stream 28.

The number of pretreatment reactor vessels can vary depending on the number of chemical coagulants being used and the reaction chemistry used to form the waste particulates. The size of the reactor vessels can be varied to provide different reaction times.

Figure 4:
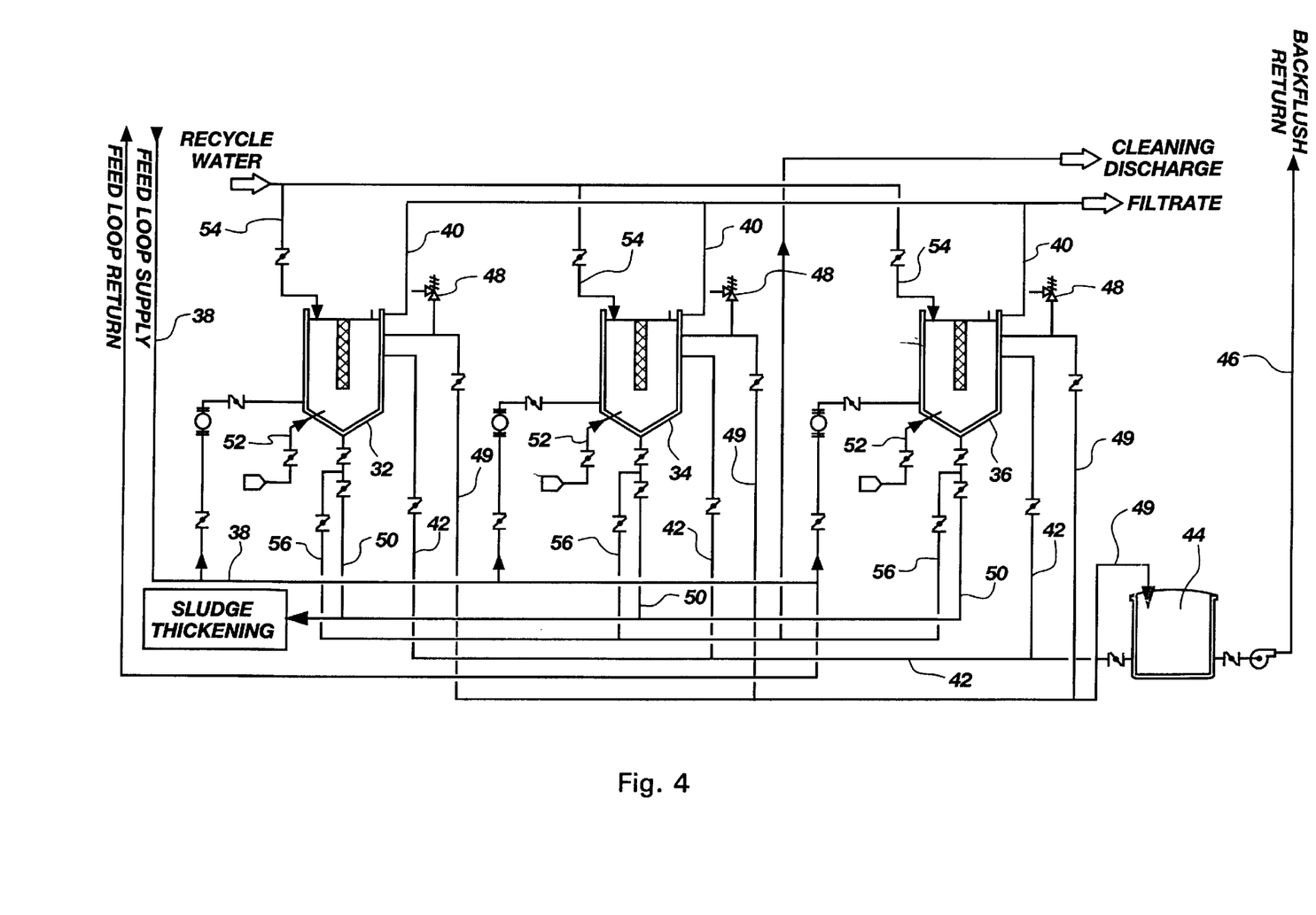
FIG. 4 is a schematic representation of one wastewater microfiltration apparatus for high flow impurity removal.

After flowing through the necessary pretreatment reactor vessels, the wastewater feed stream flows into a feed tank 30 for holding the pretreated wastewater. Additional chemical coagulants can be added directly to the feed tank 30, if necessary, via a chemical coagulant feed stream 31. As shown in FIG. 4, the pretreated wastewater is directed to one or more filtration vessels 32, 34, and 36 via filtration vessel feed stream 38. The size of feed stream 38 will depend on the designed flow rate of the filtration vessel. For example, in a system having 5 filtration vessels, each handling 2500 gpm, a 24 inch feed line to the system is suitable. Each filtration vessel 32, 34, and 36 is a stand alone filtration device. The number and size of each filtration vessel can vary depending on the system capacity requirements. The filtrate is removed from each filtration vessel via a filtrate stream 40.

Each filtration vessel preferably provides a mounting platform for from 9 to 49 filter cassette modules. One currently preferred filter cassette module contains 16 individual sock filters configured with 0.5 micron filtration membranes. The rated flow rate is 0.9 gpm per square foot of membrane area. Each full cassette module has 64 square feet of membrane area and is rated at 58 gpm with a differential pressure less than 15 psi. A lifting mechanism is preferably included to allow removal and replacement of the membrane cassette modules.

The filtration membranes are periodically backflushed with filtrate to remove solids from the membrane surface. During the backflush procedure, the filtration vessel is taken off line and wastewater is drained from the filtration vessel via a backflush exit stream 42 to a backflush tank 44. The backflush tank 44 provides temporary storage before the backflushed wastewater is conveyed to the feed tank 30 via backflush return stream 46. It is estimated that 400–500 gallons of water will be used during a typical back flush cycle for a 2500 gpm filtration vessel. A vacuum breaker 48 is preferably provided to allow equalization of pressure within the respective filtration vessel 32, 34, or 36 during the backflush procedure. A vent/relief stream 49 is provided to allow venting or release of excess or over-pressurized wastewater.

The filtrate side of the filtration vessel 32, 34, 36 is open to the atmospheric pressure. The filtrate is collected in the top of the filtration vessel and allowed to drain into the filtrate stream 40. This volume of water provides the positive head which, when coupled with the negative head of draining the pressure side of the vessel via backflush exit stream 42, produces enough positive pressure gradient to backflush the filtration membrane.

After sufficient sludge settles within the bottom of the filtration vessel 32, 34, 36, the sludge is removed via a sludge discharge stream 50. While the sludge is removed, the filtration membranes are preferably rinsed with water from a water rinse stream 52. The collected sludge is removed from the system for further processing or storage.

Periodically, the membranes may require soaking to remove trace amounts of organics. Cleaning preferably occurs as needed or as part of a regular maintenance program. The vessel drain opens to remove all contaminant via the sludge discharge stream 50. The cleaning solution is introduced into each filtration vessel through cleaning supply stream 54. Typical cleaning solutions include acids, bases, and surfactants. In some cases the filtration vessel can be returned to operation without draining and rinsing the filtration membranes. If membrane rinsing is necessary, the contents of the filtration vessel 32, 34, 36 are removed via cleaning discharge charge stream 56 for further processing.

As shown in FIG. 4, multiple filtration vessels are preferably used, in parallel, to provide for the required flow rate.

However, the filtration vessels can be operated in series to provide primary filtration and secondary filtration. Because filtration vessels are taken off line during the backflushing, additional filtration vessels and capacity are preferably used to ensure that the require discharge flow is maintained. An additional filtration vessel may be supplied to provide for off-line maintenance while the remainder of the system meets the flow rate requirements.

The wastewater treatment system preferably includes access to the various process streams to allow for sampling and analysis. The valves, pumps, and sensors customarily used in the art to safely control the described fluid flow to and from the filtration vessels are preferably provided. Such valves, pumps, and sensors also allow for automation of the process.

From the foregoing, it will be appreciated that the present invention provides a process for removing contaminants from wastewater utilizing a positive physical barrier to precipitated particles. The positive separation barrier permits discharge having lower concentration limits than conventional clarifier/sand filter systems.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

The claimed invention is:

1. A process for removing silica from large volumes of wastewater comprising the steps of:
   (a) treating a wastewater stream containing silica with an organic polymer coagulant, wherein the coagulant reacts with the silica to form a spherical, silica-based particulate which agglomerated to form a cluster having a size greater than about $5\mu$;
   (b) passing the treated wastewater through a microfiltration membrane having a pore size in the range from $0.5\mu$ to $5\mu$, such that the silica is removed from water passing through the microfiltration membrane; and
   (c) periodically backflushing the microfiltration membrane to remove solids from the membrane surface.

2. A process according to claim 1, wherein the mole ratio of silica to coagulant is in the range from 20:1 to 50:1.

3. A process according to claim 1, wherein the mole ratio of silica to coagulant is in the range from 35:1 to 45:1.

4. A process according to claim 1, further comprising the step of adjusting the pH of the wastewater stream to a pH in the range from about 5 to 11.

5. A process according to claim 1, wherein the coagulant is an epichlorohydrin/dimethylamine polymer.

6. A process according to claim 1, wherein the coagulant is an epichlorohydrin/dimethylamine polymer having a molecular weight in the range from 100,000 to 1.5 million.

7. A process according to claim 1, wherein the coagulant is an epichlorohydrin/dimethylamine polymer having a molecular weight in the range from 200,000 to 300,000.

8. A process according to claim 1, wherein the coagulant is a DADMAC (polydiallydimethylammonium chloride) polymer.

9. A process according to claim 1, wherein the coagulant is a copolymers of an acrylamide and DADMAC (polydiallydimethylammonium chloride).

10. A process according to claim 1, wherein the membrane has a PTFE (polytetrafluoroethylene) coating on polypropylene felt.

11. A process according to claim 1, wherein the membrane has a PTFE (polytetrafluoroethylene) coating on polyethylene felt.

12. A process according to claim 1, wherein the treated wastewater is passed through the microfiltration membrane at a pressure less than 80 psi.

13. A process according to claim 1, wherein the treated wastewater is passed through the microfiltration membrane at a pressure less than 25 psi.

14. A process according to claim 1, wherein the treated wastewater is passed through the microfiltration membrane at a pressure in the range from about 4 psi to 15 psi.

15. A process according to claim 1, wherein the treated wastewater is passed through the microfiltration membrane at a pressure in the range from about 5 psi to 10 psi.

16. A process according to claim 1, wherein the treated wastewater is passed through the microfiltration membrane at a flow rate is in the range from 150 gallons per square foot of membrane per day ("GFD") to 600 GFD.

17. A process for removing silica from large volumes of wastewater comprising the steps of:
   (a) treating a wastewater stream containing silica with an organic coagulant, wherein the coagulant reacts with the silica to form a spherical particulate which agglomerates to form a cluster having a size greater than about $5\mu$;
   (b) passing the treated wastewater through a microfiltration membrane having a pore size in the range from $0.5\mu$ to $5\mu$, wherein the treated wastewater flow rate is in the range from 150 gallons per square foot of membrane per day ("GFD") to 600 GFD, such that the silica is removed from water passing through the microfiltration membrane; and
   (c) periodically backflushing the microfiltration membrane to remove solids from the membrane surface.

18. A process according to claim 17, wherein the mole ratio of silica to coagulant is in the range from 20:1 to 50:1.

19. A process according to claim 17, wherein the mole ratio of silica to coagulant is in the range from 35:1 to 45:1.

20. A process according to claim 17, wherein the coagulant is an epichlorohydrin/dimethylamine polymer.

21. A process according to claim 17, wherein the coagulant is an epichlorohydrin/dimethylamine polymer having a molecular weight in the range from 100,000 to 1.5 million.

22. A process according to claim 17, wherein the coagulant is an epichlorohydrin/dimethylamine polymer having a molecular weight in the range from 200,000 to 300,000.

23. A process according to claim 17, wherein the coagulant is a DADMAC (polydiallydimethylammonium chloride) polymer.

24. A process according to claim 17, wherein the coagulant is a copolymers of an acrylamide and DADMAC (polydiallydimethylammonium chloride).

* * * * *